Feb. 13, 1940. R. E. SPARKS 2,190,388
REFRIGERATOR
Filed June 27, 1939 2 Sheets-Sheet 1
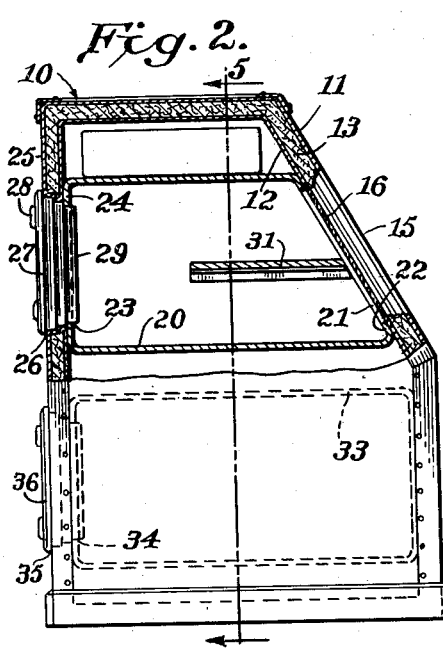
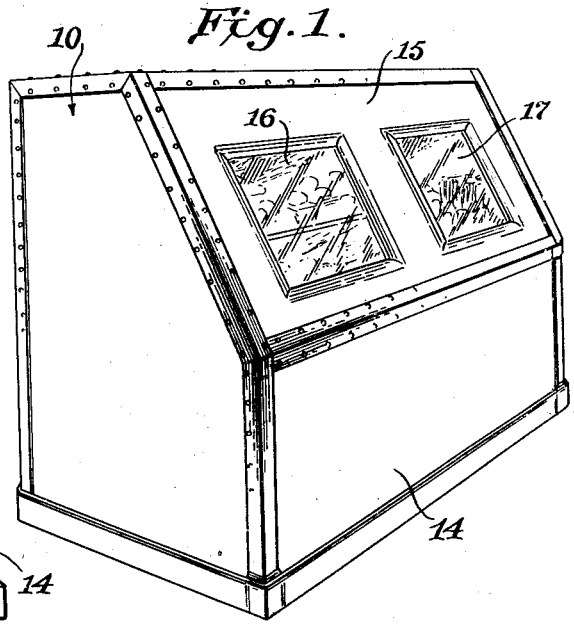
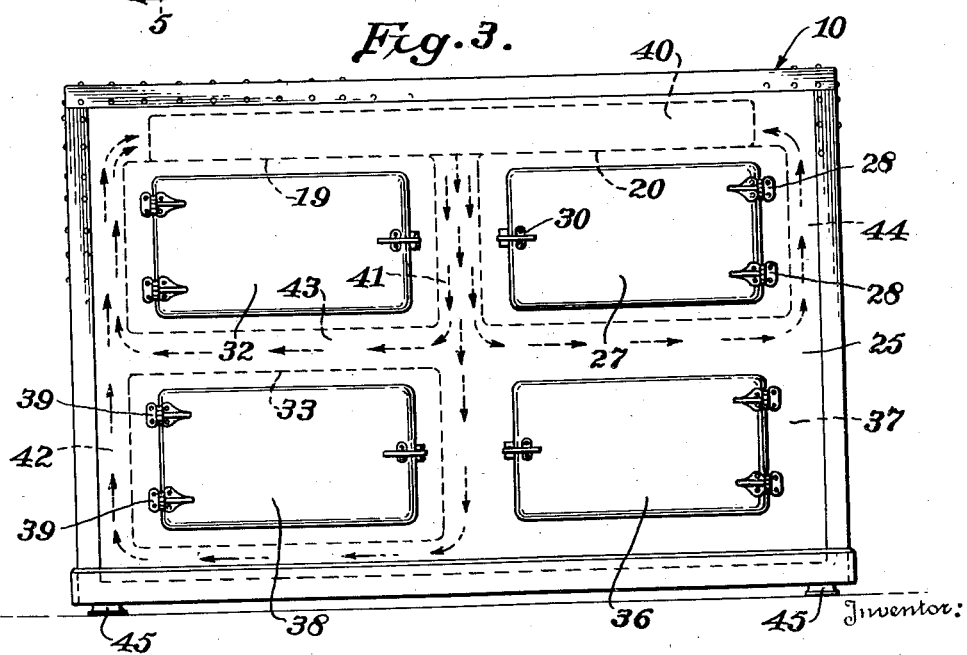
Inventor:
Roy E. Sparks,
By Cushman, Darby, Cushman
Attorneys.

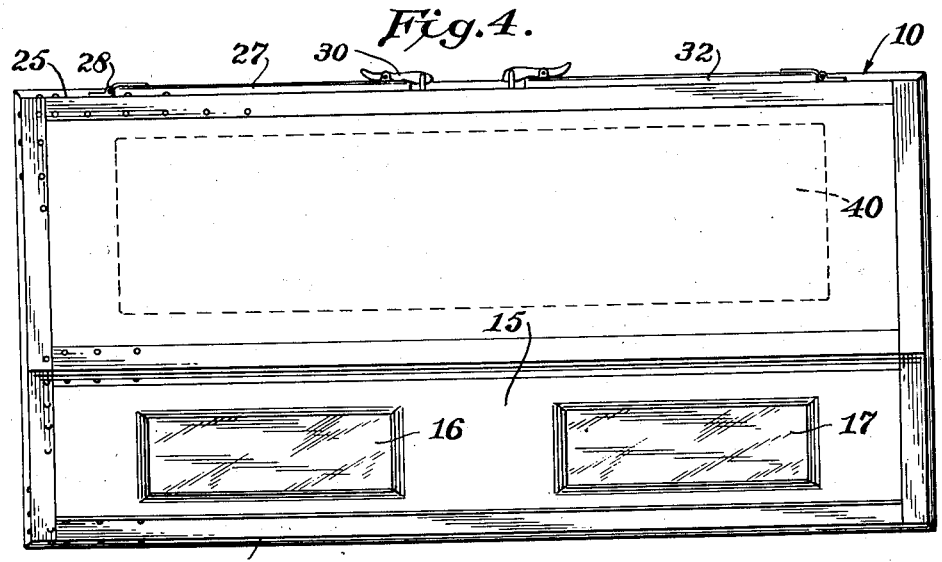
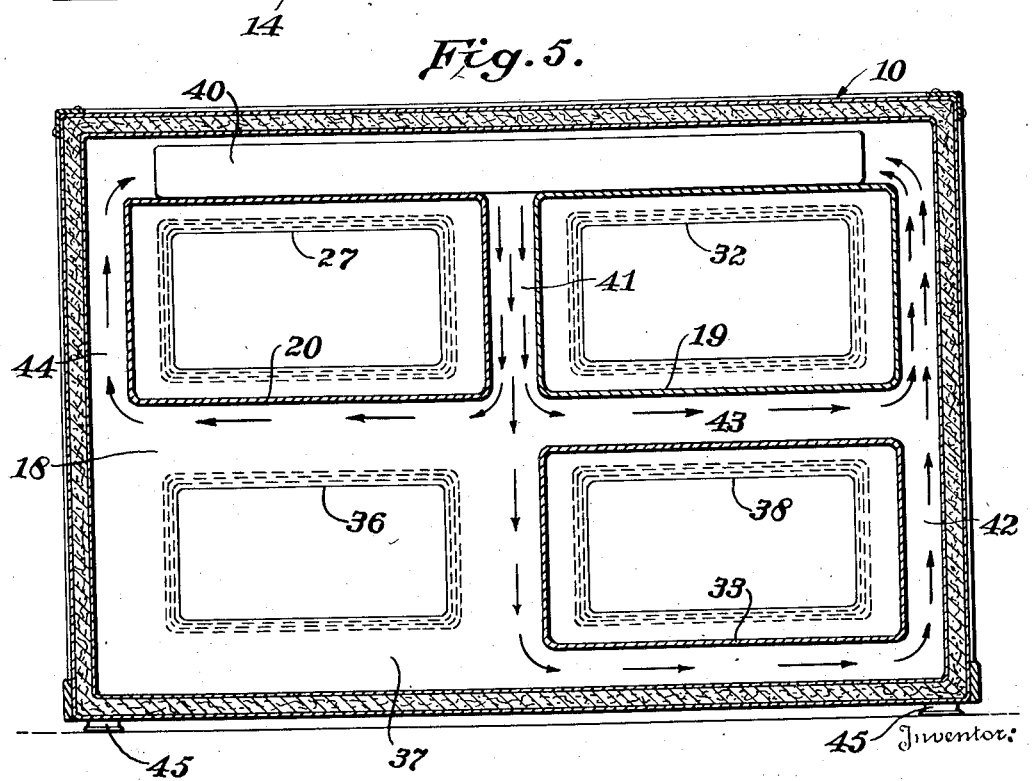

Patented Feb. 13, 1940

2,190,388

UNITED STATES PATENT OFFICE 2,190,388

REFRIGERATOR

Roy E. Sparks, Sturgis, S. Dak.

Application June 27, 1939, Serial No. 281,479

3 Claims. (Cl. 62—89.5)

The present invention relates to an improved refrigerating means for preserving perishable commodities, such as vegetables, fruits, flowers, and the like, so as to maintain the same fresh and crisp for an indefinite period of time.

In certain cooling systems now in use, means are provided for preventing the accumulation or increase of moisture within the storage compartment, while in other cooling systems in which vegetables and the like are displayed, the vegetables contact with the refrigerating unit or are exposed to the cold circulating air, with the result that the moisture in the vegetables is removed from them by the action of the cooling unit or by their contact with the circulating air.

As contrasted to these cooling systems, it is an important object of the present invention, to provide a refrigerating system with means for retaining and increasing the accumulation of moisture within a closed cooling compartment or container, so as to condense and increase the accumulation of moisture inside the container without drawing from the fresh vegetables or other perishable articles therein, any of their natural moisture.

A further object consists in associating with a container or storage compartment, a cooling unit so positioned as to effect a continuous circulation of cold air around the container to insure a uniform cooling of the entire area of the container.

Another object consists in providing an insulating casing for vegetables and the like, with a combined cooling and display chamber having normally closed spaced horizontally disposed storage compartments or containers, and in which the refrigerating unit rests on the top of the horizontally aligned containers so as to quickly cool the containers and produce an excess accumulation of moisture on the ceilings thereof. The containers are spaced from each other and the adjacent walls of the casing to provide cold air circulating passages around the containers which are out of contact with the contents thereof. The excess moisture as it accumulates on the ceiling of each of the containers drips off onto the vegetables or articles therein, thus adding to the moisture in the vegetables so as to maintain the same fresh and crisp for an indefinite period of time. Access to the inside of the containers is had through spaced openings in the casing which register with complementary openings in the adjacent sides of the containers. These openings are normally closed by doors operable from outside of the casing. The periodic opening of these doors during the usual course of business has been found to supply enough warm air to the containers to cause sufficient condensation of moisture to accumulate on the ceiling of each container for furnishing ample moisture drip to the vegetables or other perishable articles therein.

Another object consists in associating with a refrigerating chamber, a pair of spaced closed upper containers, on the top of which rests a refrigerating unit of such length as to extend substantially across the containers. Located beneath one of the upper containers, and in vertical alignment therewith is an auxiliary container, while the enlarged space below the other upper container is free or uninterrupted. The space between the containers and the adjacent walls of the casing constitutes passages through which the cold air from the refrigerating unit descends and is conducted around each of the containers so as to uniformly cool the same. As the air discharged into the enlarged space is warmer than that issuing from the refrigerating unit, this air will be forced upwardly by the cold air so as to provide the necessary circulation for causing the cooling of the containers without the cooled air being brought into contact with the contents of the containers.

Other objects and advantages of the invention will become apparent from the following description when taken in conjunction with the accompanying claims and drawings.

Referring to the drawings in which is disclosed a preferred embodiment of the invention:

Figure 1 is a perspective view of a refrigerating display case having my invention associated therewith.

Figure 2 is a side view of Figure 1, with parts in section.

Figure 3 is a rear end view of Figure 1.

Figure 4 is a plan view of Figure 1.

Figure 5 is a sectional view taken substantially along the line 5—5 of Figure 2.

Referring to the drawings in which like numerals designate like parts in the several views, 10 indicates a refrigerating display case or counter of any desirable size and shape. As shown, the walls of the case 10 comprise an outer shell or covering 11 of enamelled sheet metal and an inner spaced enamelled sheet metal shell or lining 12. Interposed between the shells is a layer of any suitable insulating material 13. The front of the case is preferably formed with a lower rectangular portion 14 and an upper inclined portion 15 having spaced display windows 16 and 17, through which the contents of the case may be seen. The inside of the casing 10 constitutes a storage chamber 18 in which is preferably positioned spaced horizontally disposed thin metallic containers 19 and 20. The container 20 has at its front end an opening 21 registering with the window 16 and is also provided with an inwardly disposed flange 22 secured to the adjacent wall or shell 12 in any suitable manner such as by welding or the like. The rear of the container 20 is formed with an opening 23 and a flange 24 which may be welded to the inner shell 12. Manifestly, the container may be connected to the casing in any suitable manner, so as to be maintained in a fixed position within the chamber 18 or may be removable therefrom. The rear wall 25 of the casing has an opening 26 in register with the opening 23. A door 27 hinged at 28 to the rear wall 25 is provided with an inwardly projecting insulating portion 29, arranged when the door is moved to its closed position, to extend into the opening 23 to close or hermetically seal the container 20. The door 27 is releasably maintained in its closed position by a latch mechanism 30.

The interior of the container 20 may be divided into two compartments by a shelf 31 for more readily displaying and separating its contents. The container 19 is formed substantially similarly to the container 20 and has its outer open end registering with the window 17 and its rear open end arranged to be closed by a door 32. Beneath one of the upper containers such as the container 19, there is positioned an auxiliary container 33 which has its sides and front ends closed and its rear end open as at 34. The container 33 vertically aligns with the container 19 and is fixedly mounted within the chamber 18 in any suitable manner such as by having its opposite ends welded to the adjacent walls of the inner shell 12. The wall 25 of the casing has an opening 35 registering with the opening 34, and also has hinged thereto a door 36 for closing the opening in the container 33. I prefer to leave the space 37 below the container 20 free or uninterrupted so as to provide an enlarged open space within the chamber 18 for facilitating the circulation of cooled air around the containers 19, 20 and 33, and for storing non-dehydrating fruits and vegetables. It will be seen that the seal connection of the front and rear of each of the containers with the front and rear walls of the casing provides means for preventing the circulated air which passes around the containers from being brought into contact with the interior of the containers.

A door 38 hinged as at 39 to the rear wall 25 of the casing provides access to the space 37. An electrical or mechanical refrigerating unit 40 of any well known type is positioned within the chamber 18 and adjacent the top thereof. The refrigerating unit 40 is of such dimensions as to extend substantially across and rest directly on the upper spaced horizontally disposed containers 19 and 20 so that when the device is in operation, the cooling temperature generated by the refrigerating unit is quickly transmitted through the thin walls of the containers 19 and 20, to cause the moisture in the air on the inside of the containers to become condensed and accumulate on the ceilings thereof without drawing from the moisture of the vegetables or other articles in the containers. The excess moisture collected on the ceiling of each of the containers drips onto the vegetables therein, thus adding to the moisture in the vegetables, so that they will remain fresh and crisp until removed from the casing.

The containers 19, 20 and 33 are intended primarily for cooling and displaying vegetables such as lettuce, spinach, parsley and celery, which if allowed to come in contact with the circulating air or refrigerating unit, would give up their moisture, and while these vegetables would remain cold, they would soon become soft, withered and unsaleable. The temperature in each container preferably is maintained at about 45° above zero, so that the vegetables will remain fresh and crisp for an indefinite period of time.

Due to the fact that the refrigerating unit is located adjacent the top of the casing so as to extend across and conductively contact with the containers constituting the upper row, the cold air as it issues from the cooling unit 40 is not only transmitted to the ceiling of the upper containers, but also passes downwardly through the passage 41 between the adjacent upper containers so as to circulate in the manner as indicated by the arrows in Figures 3 and 5. A portion of this cold air descends downwardly and around the container 33, and is conducted upwardly through the passage 42, while another portion of the old air passes transversely through the passage 43, so as to mix with the air in the passage 42 and be cooled by the refrigerating unit before again passing downwardly through the passage 41. Another portion of the air passes under the container 20 and is returned by the passage 44 to the unit 40. Thus, it will be seen that the cold air as it issues from the refrigerating unit circulates around four sides of each container and then is returned to the refrigerating unit to provide a continuous circulation of cold air outside the containers and free from contact with the vegetables so as to keep the latter fresh and crisp.

The space 37 beneath the container 20 may be used for cooling tomatoes and various other perishable articles of food which do not dehydrate when brought into contact with the refrigerating unit or the cold air circulating through the chamber 18. The casing 10 may be supported by the legs 45 connected to the bottom thereof.

The periodic opening of the doors to the containers 19, 20 and 33, in the usual course of business, allows enough warm air to enter the containers and humidify on the ceilings thereof, to develop sufficient condensation of moisture to supply ample moisture drip for maintaining fresh vegetables in perfect condition indefinitely. Moreover, as the containers are closed, the contents thereof are out of contact with the cold air circulating around the outside thereof. Consequently, the accumulation of moisture within each container does not draw moisture out of the vegetables, but rather acts to retain and add to the moisture in the vegetables, thus keeping or preserving the vegetables in a much fresher condition than other systems now in use.

Manifestly, the cooling chamber 18 may be provided with one or more storage compartments on which rests the refrigerating unit, the compartment or compartments being so spaced relative to the chamber as to permit the circulation of cold air around the same to insure uniform cooling of each container and the accumulation of extra moisture on the ceiling thereof.

It will be seen that by reason of the present invention, simple and efficient means are provided for retaining and adding moisture to the containers and the vegetables or other perishable articles therein, so that the warm air entering the containers when the doors are open, will be humidified on the ceilings of the containers when the doors are closed, thus causing drops of ice cold water to drip onto the vegetables and maintain them fresh and crisp for an indefinite period of time. Moreover, the invention may be associated with a refrigerator for either domestic or commercial use.

It is to be understood that the form of the invention shown and described is merely illustrative of a preferred embodiment and that such changes may be made as fall within the purview of one skilled in the art without departing from the spirit of the invention and the scope of the appended claims, so long as the principle of cooling and supplying extra moisture to the fresh vegetables is retained.

I claim:

1. A refrigerator of the class described including an insulating casing, a storage container for hydrated vegetables within the casing and sealed at its front and rear sides by the front and rear walls of said casing, the remaining sides of the container being spaced from the casing to provide therewith a closed air circulating passage extending around the container and out of contact with the interior of the container, said container having an opening in its rear side registering with an opening in the wall of the casing, an insulating door for closing said openings, and a refrigerating unit resting on the top of the container and having a bottom substantially coextensive in area therewith, said unit being formed to be traversed by the air circulating through said passage and cooperating therewith to cool the entire top of the container, the bottom of said unit being in conductive contact with the top of the container so as to cause an excessive accumulation of moisture being formed on substantially the entire area of the ceiling of the container, the arrangement being such that the condensed moisture accumulating on the ceiling of the container may drip onto the vegetables therein to retain and increase their moisture and warm air entering said container upon opening of said door becomes humidified so as to provide an ample supply of moisture being maintained within the container.

2. A refrigerating display case of the class described including an insulating casing, spaced containers for hydrated vegetables within the casing, means connecting the front and rear sides of the containers to the front and rear walls of said casing, the remaining sides of the containers being spaced from the casing to provide therewith closed air circulating passages extending around the containers and out of contact with the interior thereof, each of said containers having an opening in its rear side registering with an opening in the wall of the casing, means for closing said openings, and a refrigerating unit resting on top of the containers and having a bottom substantially coextensive in area therewith, said unit being formed to be traversed by the air circulating through said passages and cooperating therewith to cool the entire top of the containers, the bottom of said unit being in conductive contact with the tops of the containers so as to cause an excessive accumulation of moisture being formed on substantially the entire area of each ceiling of the containers, the arrangement being such that the condensed moisture accumulating on the ceilings of the containers may drip onto the vegetables therein to retain and increase their moisture whereby warm air entering said containers upon opening of said closing means becomes humidified upon the closing of said means so as to provide an ample supply of moisture being maintained within each of the containers.

3. A refrigerator display case of the class described including an insulating casing, spaced upper containers for hydrated vegetables within the casing, an auxiliary container spaced below and substantially in vertical alignment with one of the upper containers, means connecting the front and rear sides of the containers to the front and rear walls of said casing, the remaining sides of the containers being spaced from the casing to provide therewith closed air circulating passages extending around the containers and out of contact with the interior thereof, each of said containers having an opening in its rear side registering with an opening in the wall of the casing, means for closing said openings, and a refrigerating unit extending across and resting on top of the upper containers, said unit having a bottom substantially coextensive in area with the upper containers, said unit being formed to be traversed by the air circulating through said passages and cooperating therewith to cool the tops of the upper containers, the bottom of said unit being in conductive contact with the tops of the upper containers so as to cause an excessive accumulation of moisture being formed on substantially the entire area of the ceilings of the upper containers, the arrangement being such that the condensed moisture accumulating on the ceilings of the upper containers may drip onto the vegetables therein to retain and increase their moisture whereby warm air entering the upper containers upon opening of said closing means, becomes humidified upon the closing of said means so as to provide an ample supply of moisture being maintained within the upper containers, and the space beneath the other upper container being open to provide an enlarged compartment for vegetables, the warm air in said compartment being forced to the top of the casing by the cold circulating air to contribute to the circulation of the cold air around the containers.

ROY E. SPARKS.